United States Patent
Ishii et al.

(10) Patent No.: US 7,936,107 B2
(45) Date of Patent: May 3, 2011

(54) DRIVE WAVE GENERATION CIRCUIT

(75) Inventors: Takaaki Ishii, Higashiosaka (JP);
Yasuyuki Ueshima, Gunma-ken (JP)

(73) Assignees: Sanyo Electric Co., Ltd., Osaka (JP);
Sanyo Semiconductor Co., Ltd.,
Gunma (JP)

( * ) Notice: Subject to any disclaimer, the term of this patent is extended or adjusted under 35 U.S.C. 154(b) by 303 days.

(21) Appl. No.: 12/240,416

(22) Filed: Sep. 29, 2008

(65) Prior Publication Data
US 2009/0085434 A1    Apr. 2, 2009

(30) Foreign Application Priority Data

Sep. 27, 2007  (JP) ................. 2007-252496

(51) Int. Cl.
*H01L 41/08* (2006.01)
(52) U.S. Cl. .............. 310/316.02; 310/316.01
(58) Field of Classification Search ......... 310/316.02, 310/317, 319; 318/116–118
See application file for complete search history.

(56) References Cited

U.S. PATENT DOCUMENTS
7,288,913 B2  10/2007  Yoshitomi et al.
7,599,201 B2  10/2009  Okada FOREIGN PATENT DOCUMENTS
JP   2005354854 A   12/2005
JP   2006-320107    11/2006
KR   0750055 B1     8/2007

OTHER PUBLICATIONS

Korean Office Action for Application No. 10-2008-93698, mailed on May 20, 2010 (5 pages).
esp@cenet Patent Application for Japanese Publication No. 2005354854, publication date Dec. 22, 2005. (1 page).
esp@cenet Patent Application for Korean Publication No. 20060117226, publication date Nov. 16, 2006. (1 page).
Chinese Office Action dated Oct. 12, 2010 in corresponding Chinese Patent Application No. 200810168338.2 with partial English translation. (23 pages).
esp@cenet Patent Application for Japanese Publication No. 2006320107, publication date Nov. 24, 2006. (1 page).

*Primary Examiner* — Mark Budd
(74) *Attorney, Agent, or Firm* — Osha Liang LLP

(57) ABSTRACT

To generate a drive wave for driving a piezo-actuator. Drive data concerning the number of drive waves supplied through a serial bus is stored in a drive data storage unit. A comparing circuit detects whether or not the number of drive waves have been generated, the number being specified by the drive data, and the drive wave keeps being generated until such detection is made.

1 Claim, 7 Drawing Sheets

MOVEMENT TOWARD ∞ DIRECTION

MOVEMENT TOWARD MACRO DIRECTION

DRIVE WAVE GENERATION CIRCUIT

CROSS-REFERENCE TO RELATED APPLICATION

The disclosure of Japanese Patent Application No. 2007-252496 filed on Sep. 27, 2007 including specification, claims, drawings, and abstract is incorporated herein by reference in its entirety.

TECHNICAL FIELD

The present invention relates to a drive wave generation circuit for generating a drive wave for driving a piezo-actuator.

RELATED ART

Conventionally, a piezo-actuator which utilizes extension and retraction of a piezo-element has been proposed and expected as a micromini actuator. The piezo-actuator is employed in a mechanism mounted in a small camera for a portable telephone and the like, to drive an image capturing element to correct vibration and/or moving a lens to focus.

In the piezo-actuator, voltage is applied to a piezo-element (a piezoelectric element) for extension and retraction thereof, thereby moving a drive shaft back and forth. Then, by moving the drive shaft at one speed in one direction and a different speed in the opposite direction (extending slowly and retracting rapidly, or vice versa), a moving body in friction contact with the drive shaft is moved. As described above, extension and retraction of a piezo-element is utilized as a driving force; movement along a straight line is possible; and a coil or the like is unnecessary. A small size actuator can be realized.

Here, in order to change the speed of the back-and-forth movement of the drive shaft, a voltage waveform to be applied to the piezo-element needs to be changed. For example, for slow extension and rapid retraction, voltage application in a pattern in which voltage is applied slowly in a first direction and rapidly in the opposite direction is required.

Patent Document 1 discloses a drive wave generation circuit, in order to realize the above, for generating two kinds of basic waveforms having mutually different constant basic cycle duty ratios according to a basic clock, then counting an input drive pulse for driving, and generating a predetermined number of basic waveforms with respect to one drive pulse.
Patent Document 1: JP 2006-320107A Here, according to the above mentioned application, a duty ratio and timing for basic waveform are fixed in a drive circuit. Thus, when a piezo-element to drive is changed, the drive circuit needs to be changed.

Meanwhile, in order to ensure a variable duty ratio and timing, set data may be written in a register. In this case, data transmission utilizing a bus may be applicable in order to meet a request for using as few terminals as possible, and it is desirable for control of such data transfer and actual operation to be made efficiently.

SUMMARY OF THE INVENTION

There is provided a drive wave generation circuit for generating a drive wave for driving a piezo-actuator, comprising drive data register for storing drive data concerning a number of drive waves to be generated, the drive data being supplied through a serial bus; and drive wave generation circuit for generating a number of drive waves, the number corresponding to a number specified by the drive data stored in the drive data register.

Also, preferably, the drive wave generation circuit may include a basic waveform generation circuit for generating a basic waveform having a constant basic cycle according to a basic clock, a unit counter for counting a cycle of the basic waveform and outputting a unit detection pulse when a count value reaches a predetermined unit number, an output enable circuit for counting the unit detection pulse from the unit counter and outputting an output enable signal until a number of unit detection pulses have been counted, the number being specified by the drive data, and an output gate for outputting a drive wave having the basic waveform while the output enable circuit outputs the output enable signal, and output the drive wave having a number of basic waveforms, the number being obtained by multiplying a number of basic cycles for one unit by the number specified by the drive data input.

Also, when the drive data in the drive data register is rewritten while the enable circuit outputs an enable signal, the drive wave generation circuit may preferably add the number of new drive data to the number of previous drive data, and generate the number of drive waves corresponding to the added number.

According to the present invention, the number of drive waves to output can be controlled by transferring the drive data through a serial bus. Therefore a drive wave can be generated without requiring drive pulse transfer and the like.

DETAILED EXPLANATION OF AN EMBODIMENT

In the following, an embodiment of the present invention will be described based on the accompanying drawings.

Figure 1:
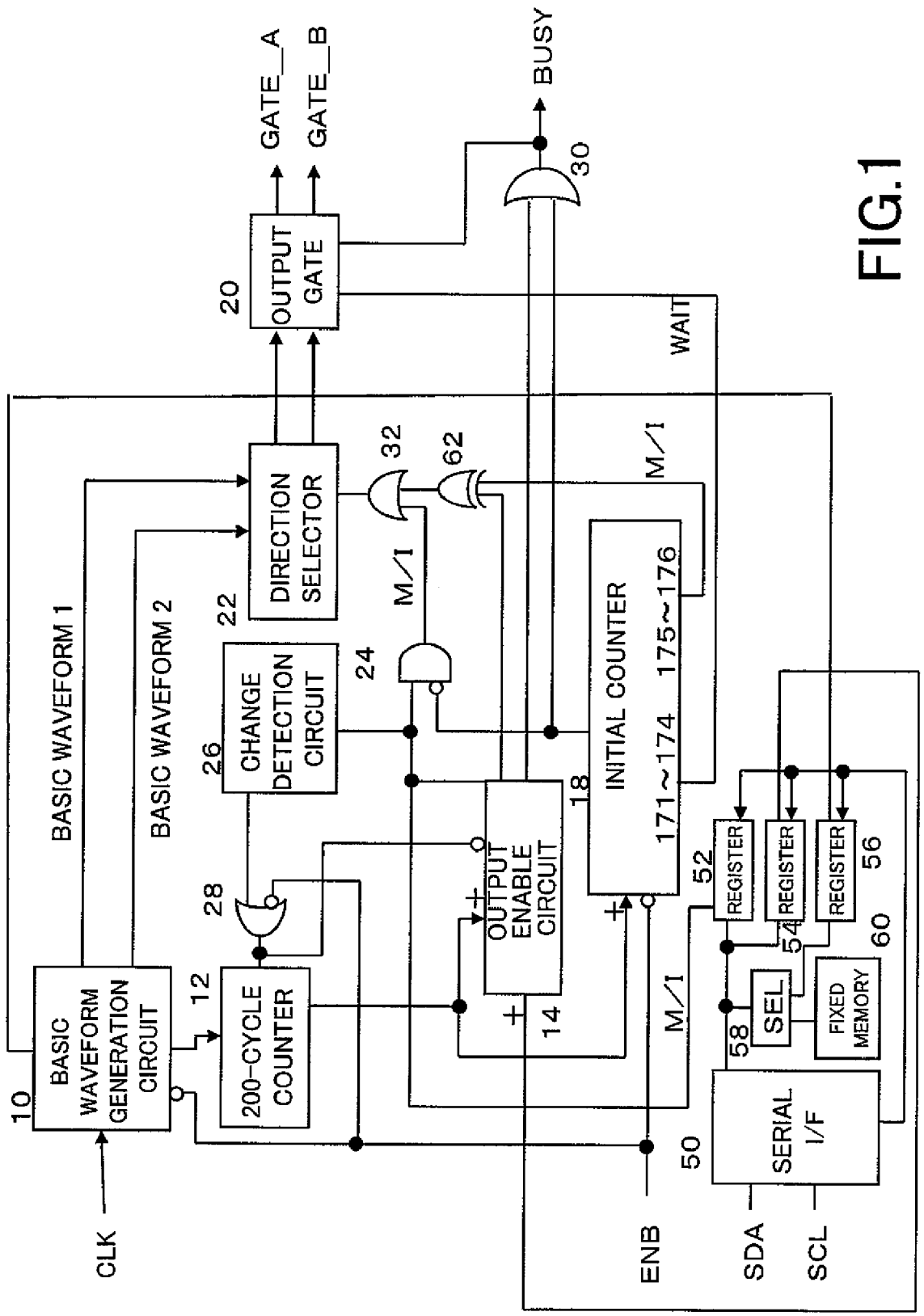
FIG. 1 is a diagram showing a complete structure of a drive wave generation circuit.

FIG. 1 is a diagram showing an entire structure of a drive wave generation circuit according to an embodiment. The drive wave generation circuit is formed as a single semiconductor integrated circuit (IC). As input terminals, two of a basic clock CLK terminal and an enable signal ENB terminal and two of a serial transfer I2C bus SDA terminal and an SCL terminal are provided. As output terminals, three of GATE_A, GATE_B, and BUSY terminals are provided.

The basic waveform generation circuit 10 outputs two basic waveforms (basic waveforms 1 and 2) based on an externally input basic clock CLK. The basic waveform generation circuit 10 may comprise, e.g., a counter for counting a basic clock for one basic waveform cycle and generate H level and L level through logical operation with respect to outputs from a plurality of flip-flops forming the counter, thereby generating two kinds of basic waveforms 1, 2. A memory for two basic waveforms 1, 2 may be provided, from which basic waveforms 1, 2 may be read.

Figure 2:
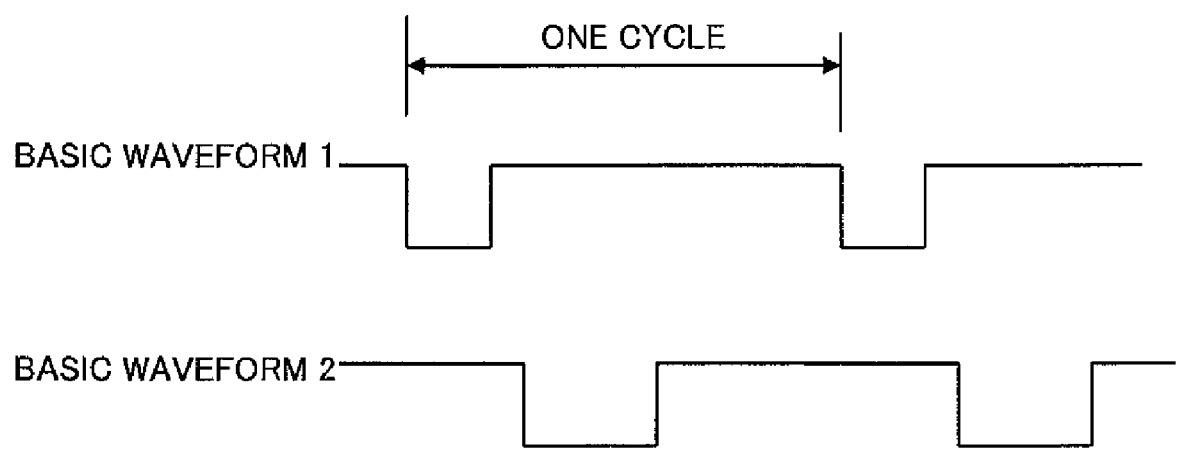
FIG. 2 is a diagram showing a waveform of a basic wave.

FIG. 2 shows an example of basic waveforms 1 and 2. For a basic clock CLK being, e.g., 9.75 MHz, it is assumed that one cycle of the respective basic waveforms 1, 2 is 134 clocks (=13.74 μsec). The basic waveform 1 becomes H level after remaining at L level for a period of 22 clocks, while the basic waveform 2 becomes H level after remaining at H level for a period of 26 clocks and L level for a period of 46 clocks. Hence, there is a period of four clocks after L level of the basic waveform 1 ends and before the basic waveform 2 becomes L level.

The basic waveform generation circuit 10 outputs one cycle pulse every basic waveform cycle. For example, output of 134 counts by the counter which counts a basic clock may be determined as one cycle pulse. The one cycle pulse is supplied to a 200-cycle counter 12, which outputs a 200-cycle pulse (a unit detection pulse) after having counted 200 one-cycle pulses (one unit).

The 200-cycle pulse is input to an addition input terminal of an output enable circuit 14.

Figure 7:
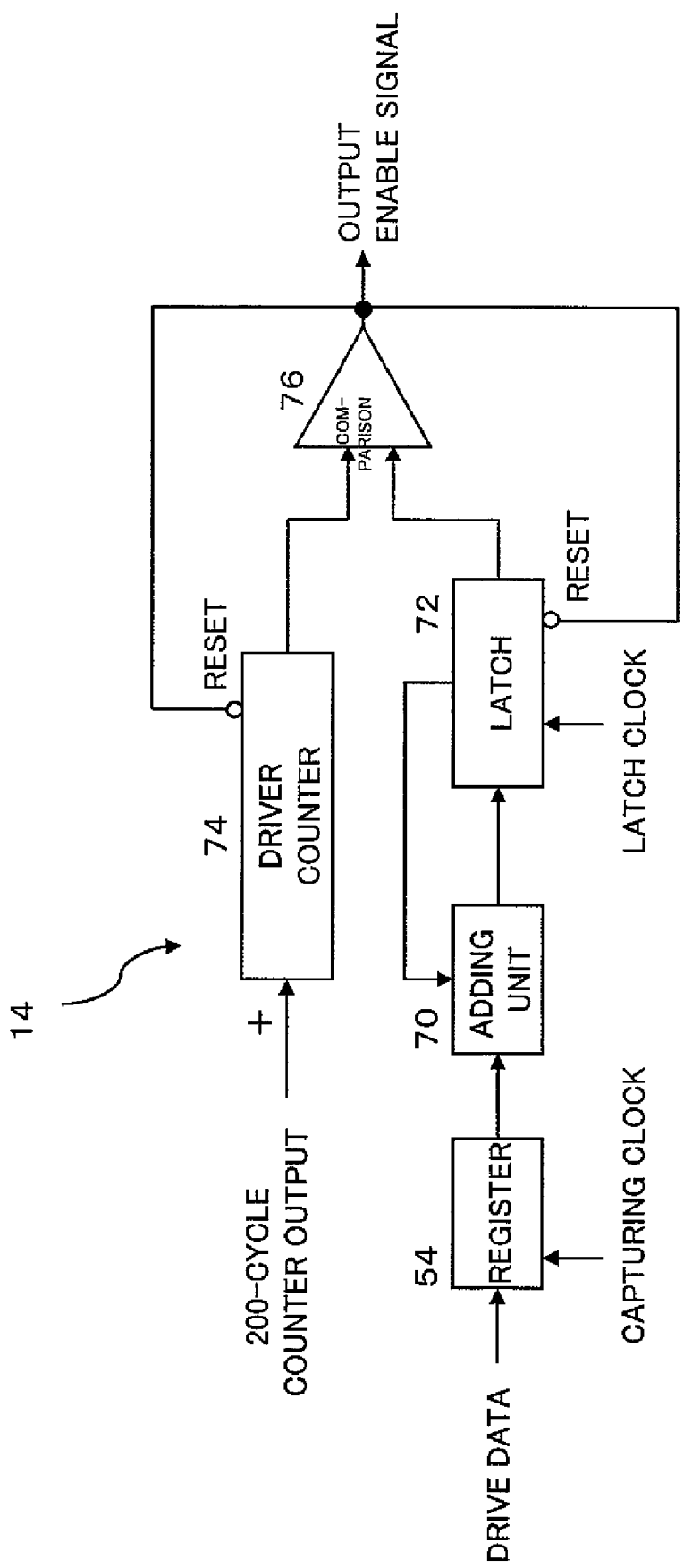
FIG. 7 is a diagram showing a structure of an output enable circuit.

Here, a structure of the output enable circuit 14 will be described based on FIG. 7. Initially, drive data which is digital data concerning the number of drive waves to output is externally supplied through serial transfer to be described later, and stored in a register 54. The drive data stored in the register 54 is input to an adding unit 70 through a parallel bus. The adding unit 70 receives an output of a latch circuit 72 for latching an output from the adding unit 70, and thus adds the drive data output from the register 54 and a value then latched by the latch circuit 72. The latch circuit 72 captures an output of the adding unit 70 at the time when a latch clock is input.

Meanwhile, an output of the 200-cycle counter is supplied to the addition terminal of a drive counter 74 which thus counts up an output of the 200-cycle counter one by one.

Then, an output from the drive counter 74 and an output from the latch circuit 72 are both input to a comparing circuit 76. The comparing circuit 76 outputs H level (enable) as an output enable signal when the output of the drive counter 74 is smaller than that of the latch circuit 72, and outputs L level (disable) as an output enable signal when the output of the drive counter 74 is equal to or larger than that of the latch circuit 72. The output enable signal is inverted and then supplied to the reset terminals of the drive counter 74 and latch circuit 72. When the output enable signal is at L level, the drive counter 74 and latch circuit 72 are both placed in a reset state "0".

In this state, when drive data is input via a serial interface 50, the register 54 captures the data. With the capturing completed, the serial interface 50 supplies a latch clock to the latch circuit 72. In this case, since the data in the latch circuit 72 is "0", the drive data having been captured by the register 54 is set intact on the latch circuit 72.

The drive data is a positive integer indicating the number of drive wave units to output, while considering 200 drive waves as one unit. With the drive data set on the latch circuit 72, an output of the comparing circuit 76 becomes H level, and the drive counter 74 therefore counts up an output pulse of the 200-cycle counter 12. When the count value of the drive counter 74 becomes equal to that of the drive data, an output from the comparing circuit 76 becomes L level, and the drive counter 74 and latch circuit 72 are reset.

The output enable signal is supplied via an OR gate 30 to an output gate 20. Thus, while H level is kept output as the output enable signal, basic waveforms 1, 2 are output to the Gate_A, Gate_B, respectively.

Further, when new drive data is input via the serial interface 50 while an output from the comparing circuit 76 remains at H level, the drive data is stored in the register 54. This new drive data is then input to the adding unit 70, to which data stored in the latch circuit 72 is also supplied. Thus, the new drive data and the data from the latch circuit 72 are added to each other.

Therefore, accumulated drive data value is stored in the latch circuit 72. The output enable signal, or an output from the comparing circuit 76, remains at H level until the drive counter 74 has counted up to the value of the added drive data. As described above, according to this embodiment, drive data newly added during operation is added to the previous drive data, so that a drive data output number can be set.

An output of the comparing circuit 76 of the output enable circuit 14 is output via the OR gate 30 as a signal BUSY, and also input to the control terminal of the output gate 20. The signal BUSY is supplied to, e.g., an external microcomputer, which realizes, based on the signal BUSY, that the drive circuit is in operation.

The basic waveforms 1, 2, generated by the basic waveform generation circuit 10, are input to the direction selector 22. A direction control signal M/I that is externally input and stored in a register 52 is supplied via an AND gate 24 and an OR gate 32 to the control terminal of the direction selector 22. The AND gate 24 is supplied with an in-operation signal from the initial counter 18 after being inverted, such that the signal remains at L level while the initial counter 18 is in operation. That is, the direction control signal M/I is supplied intact to the control terminal of the direction selector 22 when the initial counter 18 is not in operation.

(Initial Movement)

Meanwhile, the direction control signal M/I, or an output of the initial counter is, is supplied to the OR gate 32 via an EXOR (exclusive OR) gate 62, which also receives a direction control signal M/I Accordingly, while the initial counter 18 is operating, a direction control signal which is determined based on an XOR of a direction control signal M/I from the OR gate 34 and a direction control signal M/I from the initial counter 18 is supplied to the direction selector 22.

For example, assume that an externally input direction control signal M/I is made L level "0" and movement in the ∞ direction is thereby instructed. The direction control signal M/I from the initial counter 18 is a signal which becomes H level only when the count value by the initial counter 18 is 175, 176, and an output of the EXOR gate 62 remains at L level up to the count value 174 and becomes H level only when the count value is 175, 176.

Meanwhile, assuming that an externally input direction control signal M/I is made H level and movement in the macro direction is thereby instructed, an output of the EXOR gate 62 remains at H level up to the count value 174 counted by the initial counter 18 because the direction control signal M/I from the initial counter remains at L level, and becomes L level only when the count value is 175, 176.

As described above, in this embodiment, by setting such that an output from the register 52 becomes L level, the lens is moved in the ∞ direction in the initial operation, and by setting such that an output from the register 52 becomes H level, the lens is moved in the macro direction in the initial operation.

The direction selector 22 switches and outputs basic waveforms 1 and 2 to the two output terminals according to the direction control signal M/I supplied to the control terminal thereof. In this example, the direction control signal M/I is a signal supplied from an external microcomputer and indicating lens movement in either the macro (M) or ∞ (I) direction. The direction selector 22 outputs the basic waveforms 1 and 2 intact to the two output terminals when the direction control signal M/I is at L level. This is a signal for moving the lens in the ∞ (I) direction. Meanwhile, when the direction control signal M/I is at H level, the direction selector 22 switches and then outputs the basic waveforms 1, 2 to the two output terminals. This is a signal for moving the lens in the macro (M) direction. With the two outputs of the direction selector 22 output via the output gate 20 as signals GATE_A and GATE_B, respectively, extension and retraction of the piezo-element is controlled, whereby the lens is moved in the ∞ or macro direction.

Figure 3:
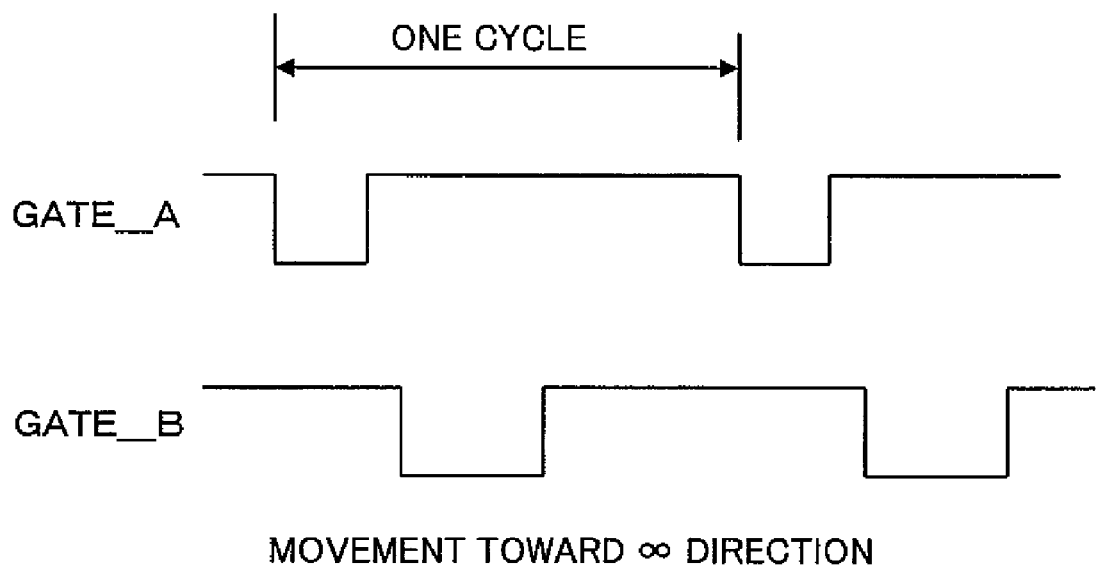
FIG. 3 is a diagram showing a waveform of a drive wave.
Figure 3:
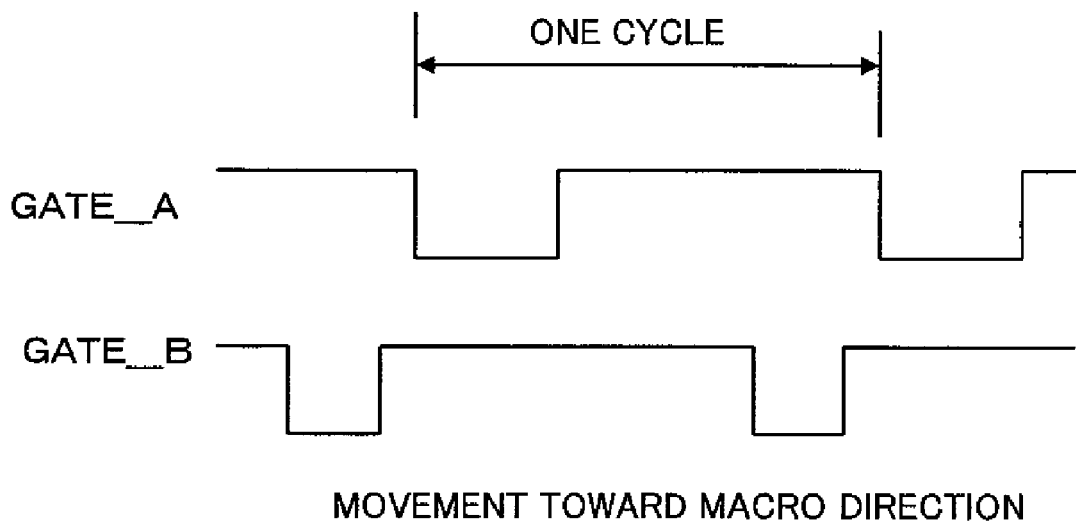

That is, as shown in FIG. 3, for the direction control signal M/I at L level (movement in the ∞ direction), the basic waveforms 1, 2 are output intact as GATE_A, GATE_B, respectively, and for the direction control signal M/I at H level (movement in the macro direction), the basic waveform 1 is output as GATE_B and the basic waveform 2 is output as GATE_A.

The direction control signal M/I is also supplied to a change detection circuit 26. The change detection circuit 26 detects rise and fall of the direction control signal M/I and outputs a change detection pulse, which is supplied via the OR gate 28 to the reset terminal of the 200-cycle counter 12. The OR gate 28 also receives an enable signal ENB, and outputs H level when the enable signal ENB is at L level.

An output of the OR gate 28 is supplied to the reset terminals of the 200-cycle counter 12 and drive counter 14. Hence, when the enable signal ENB is at L level and when the state of the direction control signal M/I is switched (a period with the change detection pulse at H level), the 200-cycle counter 12 and drive counter 14 are placed in a reset state.

Note that the enable signal ENB is inverted and input to the reset terminal of the basic waveform generation circuit 10, so that the basic waveform generation circuit 10 is prohibited from outputting while the enable signal ENB remains at L level.

The initial counter 18 also receives the enable signal ENB, and counts the 200-cycle pulses up to 176 once after the enable signal ENB rises. For example, having counted 176, the initial counter 18 outputs a completion pulse. The initial counter 18 is reset according to the completion pulse, and then placed in a rest state until the next rise of the enable signal ENB. With the above, the initial counter 18 counts 176 once every rise of the enable signal ENB.

Then, the initial counter 18 outputs H level via the 171 to 174 terminals thereof when the count value is 171 to 174. The output is supplied as a wait (output prohibiting) signal to the output gate. A direction control signal M/I which becomes H level when the count value is 175 to 176 and becomes H level when the count value is otherwise is output via the 175 to 176 terminals. That is, the initial counter 18 outputs a direction control signal M/I for selecting the ∞ direction when the count value is 0 to 174 and the macro direction when the count value is 175 to 176. The direction control signal M/I is supplied via the OR gate 32 to the direction selector 22.

While the initial counter 18 is operating, outputting from the drive counter 14 and output of a direction control signal M/I are prohibited by the AND gate 24, so that the direction selector 22 and output gate 20 operate according to an output from the initial counter 18.

Therefore, at the initial setting when the enable signal ENB rises, the initial counter 18 operates, the direction selector 22 and output gate 20 are controlled, and a direction control signal M/I for movement toward the direction is supplied to the direction selector 22 up to the count value 174 and a direction control signal M/I for movement toward, e.g., the macro side is supplied to the direction selector 22 during a period with the counter value 175 to 176. Thereafter, an externally supplied direction control signal M/I is supplied intact to the direction selector 22.

Further, an inverted signal of an in-operation signal, an output of the drive counter 14, and an in-operation signal of the initial counter 18 are supplied also to the OR gate 30. An output of the OR gate 30 is supplied to the output gate 20, as described above, and also to the outside as a busy signal BUSY. Hence, when the initial counter 18 is operating and when the count value of the drive counter 14 is not "0", the busy signal BUSY becomes H level.

(Serial Bus)

In this embodiment, a serial interface (I/F) 50 based on I2C is provided, to which an SDA bus and an SCL bus from an external microcomputer are connected. The registers 52, 54, 56 are connected to the serial I/F 50 through a data bus. The serial I/F 50 sequentially captures data supplied to the SDA bus, according to a transfer clock supplied to the SCL bus, and writes the data sent to any of the registers 52, 54, 56, which has the address designated by the data.

Data of a direction control signal M/I is written into the register 52 connected to the serial I/F 50; drive data is written into the register 54; and data concerning a basic waveform is written into the register 56.

According to the direction control signal M/I to be written into the register 52, a drive wave output for movement toward the infinity ∞ side of the lens and a drive wave output for movement toward the macro side can be switched.

Further, the register 56 is connected to the basic waveform generation circuit 10, so that the basic waveform generation circuit 10 controls the waveforms of the basic waveforms 1 and 2 to be generated, based on the data written in the register 56. For example, a duty ratio, timing, frequency and the like are determined based on the data written in the register 56. For example, while data concerning the waveforms 1 and 2 are written in advance in the register 56, the basic waveform generation circuit 10 may read the data and generate basic waveforms 1, 2.

It is preferable that a count value of the 200-cycle counter 12 and a set value for the initial counter 18 be provided as data to be transferred from the serial bus. For example, by setting a value, e.g., 150 or 300, other than 200 as a set value up to which the 200-cycle counter 12 counts, the number of basic waveforms to be generated in response to a single drive pulse can be set at a value other than 200. Also, by changing a set value for the initial counter 18, the number of drive waves for movement in one direction (an infinity direction) in the initial operation and/or the number of drive waves for returning can be desirably set. For example, desirable setting, such as 1 to 149 for movement in the infinity direction, 150 to 154 for waiting, and 155 to 156 for movement in the macro direction, and so forth is possible.

(Use of Fixed Memory)

In this embodiment, a selector 58 is provided between the serial I/F 50 and the register 56 and connected to a fixed memory 60. Use of the selector 58 makes it possible to switch data to be stored in the register 56 between data from the serial I/F 50 and data from the fixed memory 60.

Figure 6:
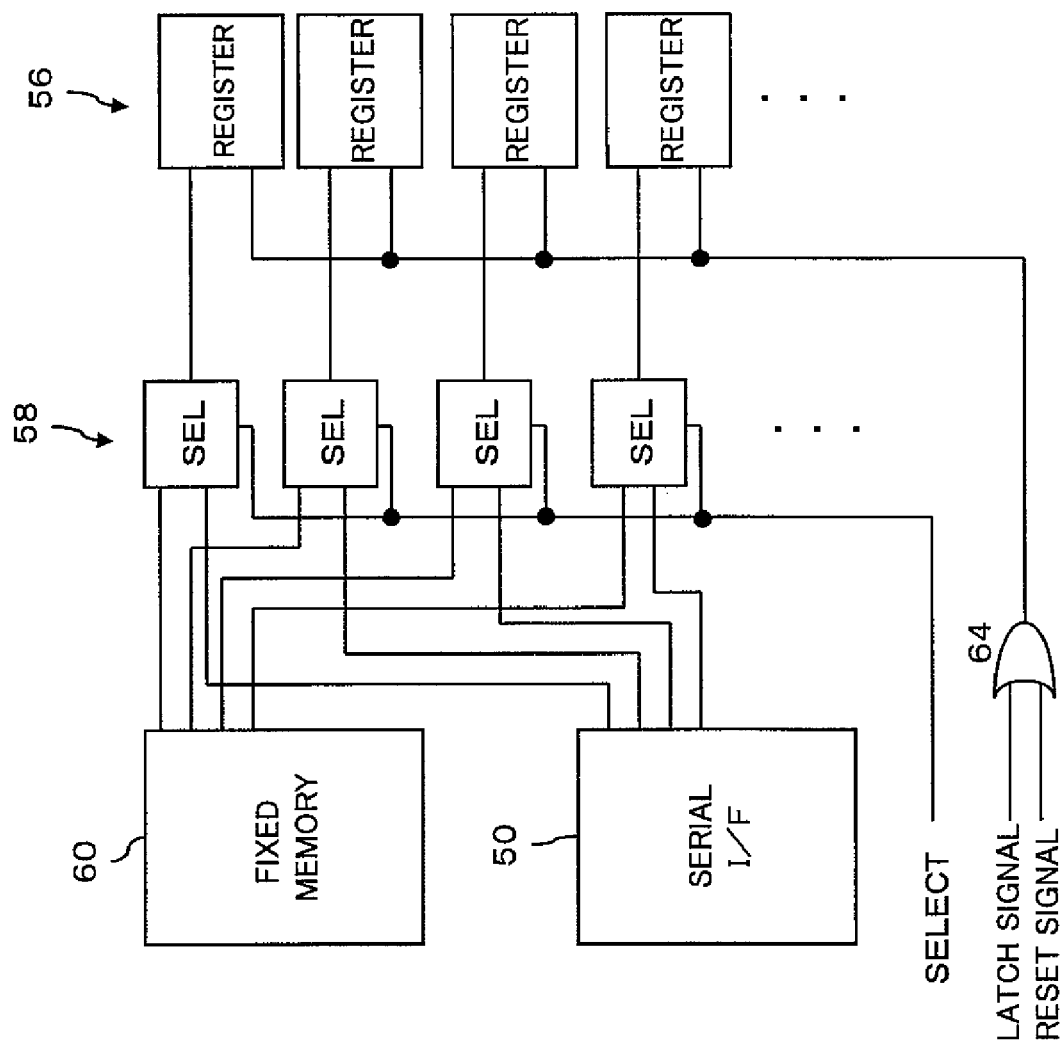
FIG. 6 is a diagram showing a structure of a selector and a register.

FIG. 6 shows a specific structure. Fixed value data for respective bits from the fixed memory 60 and setting data for respective bits from the serial I/F 50 are input to the selectors 58 for the respective bits, and outputs of the selectors 58 for respective bits are connected to the registers 56 for respective bits. The selector 58 determines which to select according to a selection signal SELECT. The selection signal SELECT may be serially transferred from a microcomputer and set on a separately provided register. For example, it may be set as default such that the fixed memory 60 side is selected in response to a selection signal SELECT.

A latch signal and a reset signal are input to the OR gate 64, and an output of the OR gate 64 is supplied to the control terminals of the registers 56 for respective bits. The register 56 outputs an input signal intact in response to H level input to the control terminal thereof, and holds the value at the time when the input to the control terminal becomes L level.

At the time of starting the system, a reset signal temporarily becomes H level, and the selector 58 then selects the fixed memory 60. Therefore, when the reset signal returns to L level, data in the fixed memory 60 is held in the register 56. Meanwhile, to set data through serial transfer, the selection signal SELECT is made L level so that the latch signal becomes H level with the serial I/F 50 selected. With the above, externally supplied serial data is supplied as parallel data to the register 56 and set on the register 56 at the time when the latch signal returns to L level.

In the following, an operation of the above described drive wave generation circuit will be described.

"Initial Setting Operation"

Initially, when the camera is powered on for use, a microcomputer for controlling camera operation begins operating, setting an enable signal ENB initially at L level. With the enable signal ENB at L level, a reset signal is supplied to the basic waveform generation circuit 10, 200-cycle counter 12, drive counter 14, and initial counter 18, whereby an incorporated counter is reset and the drive wave generation circuit is thereby placed in a rest state. Also, a basic clock CLK is supplied from outside (a microcomputer). Note that a direction control signal M/I is unnecessary at this stage, and that it is preferable that the drive counter 74 and latch circuit 72 both inside the output enable circuit 14 are reset in advance. Also, note that the reset signal may be an inverted signal of the enable signal ENB.

Thereafter, the microcomputer changes the enable signal ENB at L level to H level. In response to the rise, the basic waveform generation circuit 10, 200-cycle counter 12, drive counter 14, and initial counter 18 begin operating. Because an in-operation signal from the initial counter 18 is changed to H level here, a BUSY signal becomes H level, and a control signal for output permission is supplied to the output gate 20.

Also, since an in-operation signal of the initial counter 18 is inverted and supplied to the AND gate 24, an output of the initial counter 18 becomes L level. Since the L level output is supplied via the OR gate 32 to the direction selector 22, the direction selector 22 outputs a pair of basic waveforms 1 and 2 for movement toward the infinity ∞ direction.

Then, the initial counter 18 counts up a 200-cycle pulse from the 200-cycle counter 12. When the counter value of the initial counter 18 reaches 171, a wait signal is supplied to the output gate 20, whereby subsequent signal output is prohibited. For the count value of the initial counter 18 being 175, 176, the initial counter 18 outputs H level as a direction control signal M/I, and therefore the basic waveforms 1 and 2 for movement toward the micro direction are switched by the direction selector 22, and then output via the output gate 20.

In response to the $177^{th}$ count, an overflow signal is output; the initial counter 18 stops operating; and the in-operation signal becomes L level. With the above, an initial setting operation ends.

For example, a flip-flop to be set in response to rise of an enable signal ENB is provided so that the initial counter 18 can be made to operate in response to an output from the flip-flop and placed in a reset state by resetting the flip-flop in response to the overflow signal.

As described above, in this embodiment, an initial setting operation is carried out using an enable signal ENB indicating whether or not to make the drive wave generation circuit operating. Thus, input of a specific control signal is unnecessary to begin the initial setting operation, and consequently the number of terminals of the drive wave generation circuit can be reduced.

Also, because data of the fixed memory 60 is set on the register 56 as the reset signal temporarily becomes H level, as described above, basic waveforms 1 and 2 based on the data set on the fixed memory 60 are output from the basic waveform generation circuit 10. As the fixed memory 60 is used as described above, even when the content of the register 56 is rewritable, it is possible to promptly determine the content of the register 56 and thus to generate a drive wave rapidly. Note that the fixed memory 60 can be a rewritable nonvolatile memory, such as metal connection, a mask ROM, a flash memory, and the like.

Here, in this embodiment, movement toward the direction by an extent corresponding to 170 200-cycle pulses corresponds to a movement amount sufficient to make the lens, wherever located, move to the limit in the ∞ direction and to mechanically stop the movement. Thus, the lens subjected to the movement is held in a position beyond the ∞ position. Then, after waiting for awhile, the lens moves in the macro direction by an extent corresponding to two 200-cycle pulses, whereby the lens is reliably held in the ∞ position. Note that the initial position of the lens may alternatively be the opposite position, or the macro position, and that by changing the movement amount after the wait, the lens can be initially set in a desired position. Thus, the initial lens position can be determined without using a lens position detecting sensor and the like.

(Change of Initial Position)

In this embodiment, the EXOR gate 62 is provided so that an output of the initial counter 18 can be inverted, as described above. Data for determining a movement direction is written in the register 52, using serially transferred data.

For an H level output of the register 52, the output ports for the basic waveforms 1 and 2 are inverted by the direction selector 22, and a drive wave for movement toward the macro side in the initial operation is output. That is, by outputting from a microcomputer a signal for causing the direction control signal M/I to be at H level, the operation of the direction selector 22 in accordance with an output from the initial counter 18 is inverted, so that the lens can be moved toward the macro side in the initial operation.

"Normal Operation"

In normal operation, a basic clock CLK is normally supplied and an enable signal ENB remains at H level. In this state, the microcomputer determines a lens movement direction and amount, based on focusing information, and supplies a direction control signal M/I and drive data in accordance with the determined lens movement direction and amount to the drive wave generation circuit. That is, for movement in the macro direction, the direction control signal M/I is set at H level, and for movement in the direction, the direction control signal M/I is set at L level. Then, the drive data stored in the register 54 is supplied to the latch circuit 72. In this embodiment, a piezo-element is used for the movement and the lens moves by about 5 μm in response to 200 basic waveforms 1, 2. Thus, when it is determined that movement of 50 μm is necessary, a numeric value "10" is sent as drive data, which is then set on the latch circuit 72. Then, when the value of the drive counter 74 becomes 10 in response to an output from the 200-cycle counter 12, an output of the comparing circuit 76 is supplied to the control terminal of the output gate 20, whereby output of a drive wave from the output gate 20 is prohibited.

As described above, in this embodiment, drive data "1" is made to correspond to 200 cycles of basic waveforms 1, 2. With the above, a drive pulse generated by the microcomputer can have a sufficiently lower frequency compared to that of a basic waveform, as a result of which processing load on the microcomputer can be reduced. Further, because the microcomputer does not need to generate a basic waveform itself, processing load on the microcomputer can be reduced.

Focusing information is obtained from, e.g., brightness information of an image having received light. That is, the sum of the obtained image brightness becomes larger when the image is sharply focused. Thus, change in brightness is measured while the lens is moving in one direction, and focusing information can be obtained from the state of change. In this case, it is often preferable that the lens moves once excessively and then backward to be located at the optimum position.

In this embodiment, upon detection of change in the state of the direction control signal M/I by the change detection circuit 26, the 200-cycle counter 12 and drive counter 14 are reset to 0. Therefore, the microcomputer can attain focusing operation by outputting, e.g., 100 drive pulses to move the lens in one direction, then detecting a focused position with the lens moving in that manner, further calculating a movement amount to return to a focused position when the lens passes the focused position, and outputting that number of drive pulses. Even though the lens is initially set to move in the opposite direction, the movement direction can be instantly reversed by switching the direction control signals M/I.

As described above, by resetting the drive counter 74 and latch circuit 72 according to change in the state of the direction control signal M/I, freedom of design for the processing sequence for the microcomputer in the focusing operation is enhanced, and an appropriate focusing operation can be attained.

Note that only the drive counter 74 and latch circuit 72 may be reset, without resetting the 200-cycle counter 12.

As described above, according to this embodiment, combination of two signals, namely, the direction control signal M/I and drive data, enables effective drive wave generation.

Figure 4:
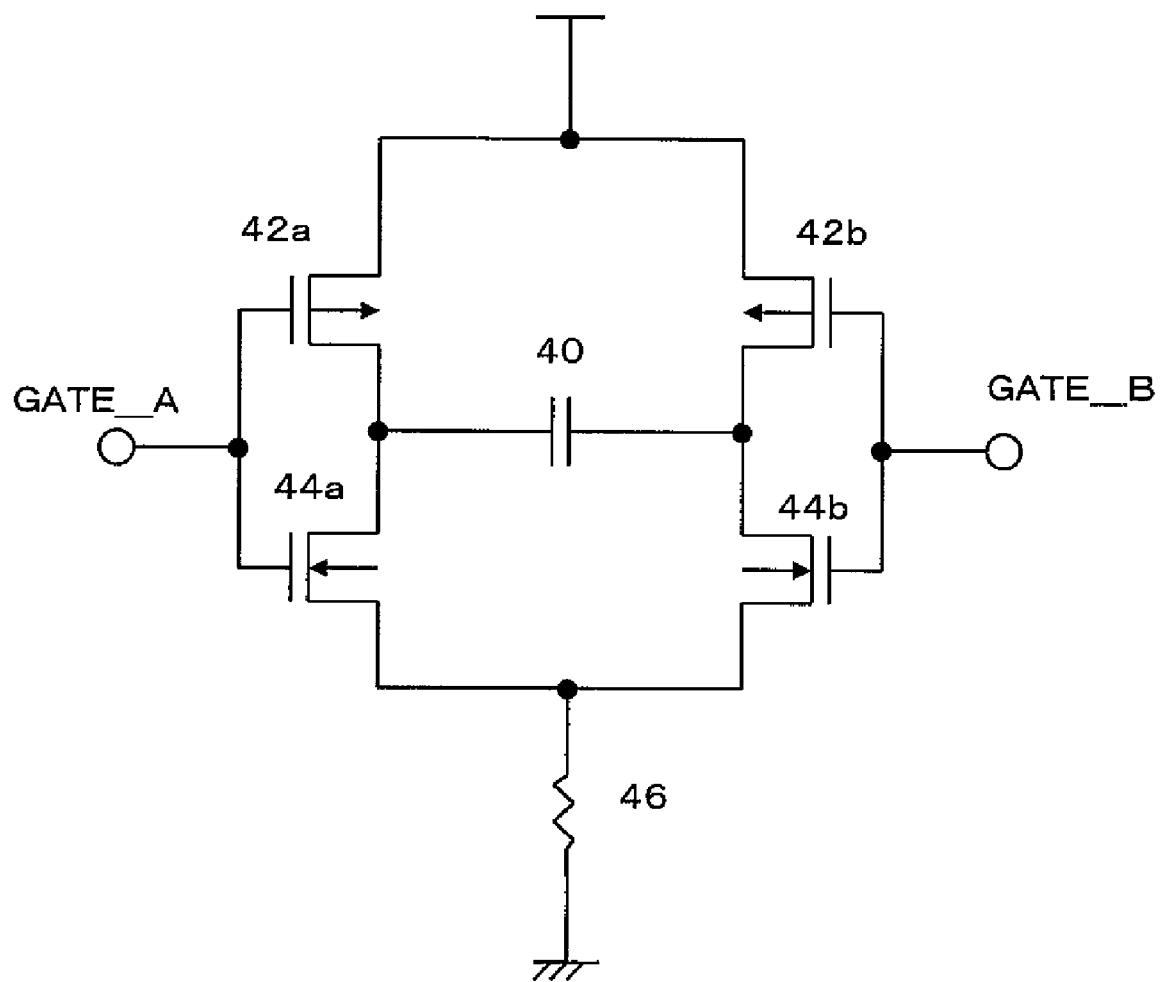
FIG. 4 is a diagram showing a drive circuit of a piezo-element.

FIG. 4 shows one example of a piezo-element drive circuit. The piezo-element 40 is expressed as a capacitance in the diagram as it can be electrically considered as capacitance.

The sources of two p-channel transistors 42a, 42b are connected to the power source, and the drains of the transistors 42a, 42b are connected to the respective drains of the n-channel transistors 44a, 44b. The sources of the transistors 44a, 44b are grounded via a resistance 46. A signal GATE_A is input to the gates of the transistors 42a, 44a and a signal GATE_B is connected to the gates of the transistor 42b, 44b. The piezo-element 40 is connected between the connection point of the transistors 42a, 44a and that of the transistors 42b, 44b.

The transistors 42a, 44a constitute an inverter, and a GATE_A is inverted and then supplied to one end of the piezo-element 40; the transistors 42b, 44b constitute an inverter, and a GATE_B is inverted and then supplied to the other end of the piezo-element 40.

Figure 5:
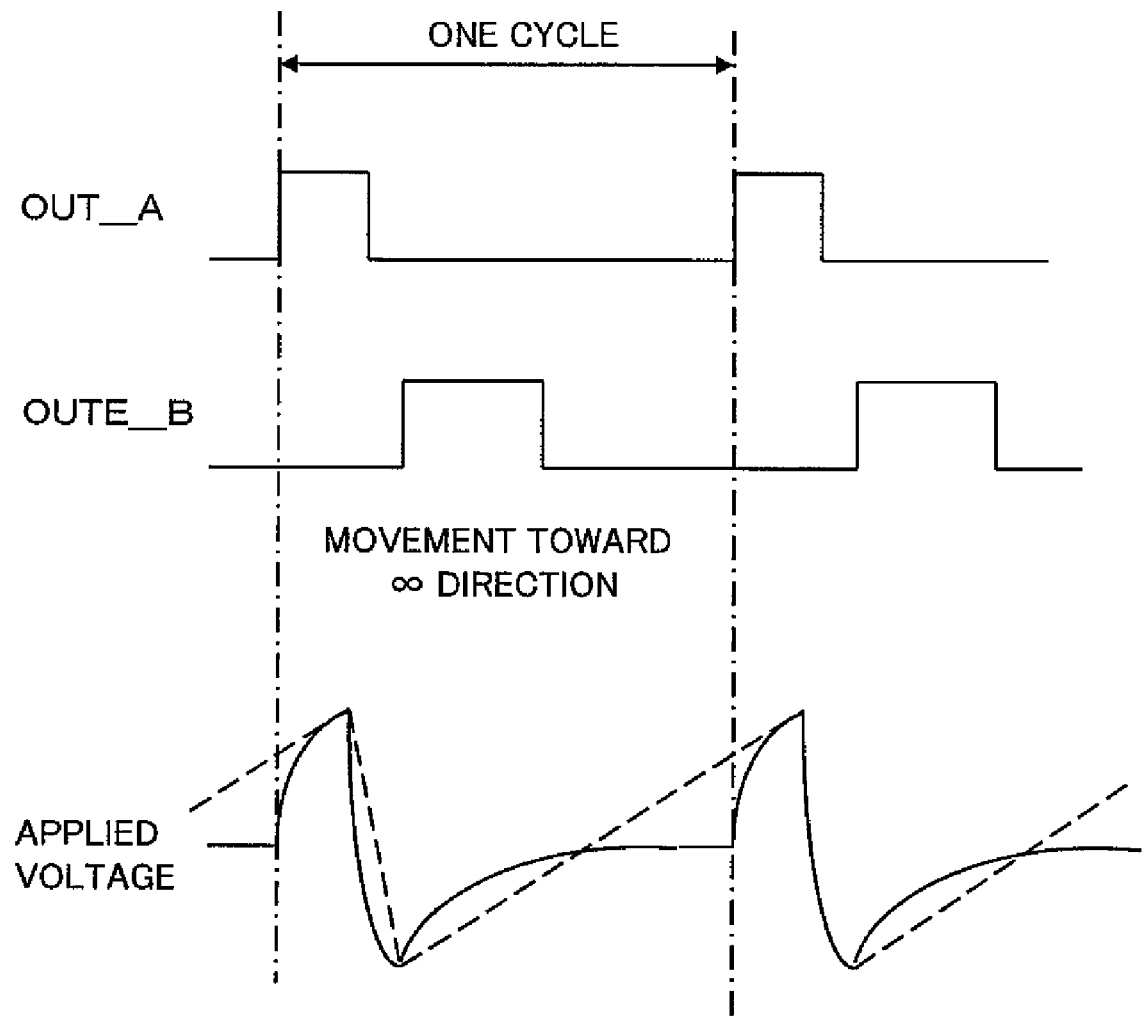
FIG. 5 is a diagram showing a drive waveform of a piezo-element.

Therefore, when the basic waveforms 1, 2 shown in FIG. 2 are supplied as GATE_A, GATE_B, respectively, to the drive circuit, the voltage OUT_A at one end 40A of the piezo-element 40 and the voltage OUT_B at the other end 40B thereof will change as shown in FIG. 5. Here, while power voltage is instantly applied to the piezo-element 40 when the transistors 42a, 42b are turned on, the voltage at the one end 40A of the piezo-element 40 will change as shown in FIG. 5, using the voltage at the other end 40B as a reference, due to the presence of the resistance 46 when the transistors 44a, 44b are turned on. With the above, saw-like voltage application in which voltage is applied rapidly to the piezo-element 40 in one direction but slowly in the opposite direction, as indicated by the broken line in the diagram, can be attained. Hence, the piezo-element 40 operates by extending slowly and retracting rapidly (or vice versa), and the lens can move utilizing the difference in the extending and retracting speeds.

(Operation by Serial Data)

In normal operation, by writing drive data as serial data into the register 54 and writing a direction control signal M/I into the register 52, output of a drive wave in the direction determined according to the direction control signal M/I begins. Thus, it is possible to output a drive wave in a desired direction for a desired period by writing data in the registers 52, 54, utilizing the serial bus.

What is claimed is:

1. A drive wave generation circuit for generating a drive wave for driving a piezo-actuator, comprising:
drive data register for storing drive data concerning a number of drive waves to be generated, the drive data being supplied through a serial bus;
drive wave generation circuit for generating a number of drive waves, the number corresponding to a number specified by the drive data stored in the drive data register;
a basic waveform generation circuit for generating a basic waveform having a constant basic cycle according to a basic clock,
a unit counter for counting a cycle of the basic waveform and outputting a unit detection pulse when a count value reaches a predetermined unit number,
an output enable circuit for counting the unit detection pulse from the unit counter and outputting an output enable signal until a number of unit detection pulses has been counted, the number being specified by the drive data,
an output gate for outputting a drive wave having the basic waveform while the output enable circuit outputs the output enable signal, and outputting a drive wave having a number of basic waveforms, the number being obtained by multiplying a number of basic cycles for one unit by the number specified by the drive data input, and
wherein when the drive data in the drive data register is rewritten while the enable circuit outputs the enable signal, and the drive wave generation circuit adds a number specified by new drive data to a number specified by previous drive data, and generates a number of drive waves, the number corresponding to the added number.

* * * * *

UNITED STATES PATENT AND TRADEMARK OFFICE
CERTIFICATE OF CORRECTION

| | | |
|---|---|---|
| PATENT NO. | : 7,936,107 B2 | Page 1 of 1 |
| APPLICATION NO. | : 12/240416 | |
| DATED | : May 3, 2011 | |
| INVENTOR(S) | : Takaaki Ishii et al. | |

It is certified that error appears in the above-identified patent and that said Letters Patent is hereby corrected as shown below:

On the Title Page, Item (56) Other Publications, line 3, 5, and 10 the word "Application" should read --Abstract--.

In claim 1, column 10, line 54, the word "when" should not appear in the text.

Signed and Sealed this
Sixteenth Day of August, 2011

David J. Kappos
*Director of the United States Patent and Trademark Office*